(12) United States Patent
Suzuki et al.

(10) Patent No.: US 11,601,007 B2
(45) Date of Patent: Mar. 7, 2023

(54) DC POWER SUPPLY SYSTEM

(71) Applicant: TDK Corporation, Tokyo (JP)

(72) Inventors: Shingo Suzuki, Tokyo (JP); Katsuo Naoi, Tokyo (JP); Takuma Mitsunaga, Tokyo (JP)

(73) Assignee: TDK CORPORATION, Tokyo (JP)

( * ) Notice: Subject to any disclaimer, the term of this patent is extended or adjusted under 35 U.S.C. 154(b) by 0 days.

(21) Appl. No.: 17/428,144

(22) PCT Filed: Feb. 4, 2019

(86) PCT No.: PCT/JP2019/003850
§ 371 (c)(1),
(2) Date: Aug. 3, 2021

(87) PCT Pub. No.: WO2020/161767
PCT Pub. Date: Aug. 13, 2020

(65) Prior Publication Data
US 2022/0094191 A1    Mar. 24, 2022

(51) Int. Cl.
*H02J 7/34* (2006.01)
*H02J 1/00* (2006.01)

(52) U.S. Cl.
CPC . *H02J 7/34* (2013.01); *H02J 1/00* (2013.01)

(58) Field of Classification Search
CPC ........ H02J 7/34; H02J 7/35; H02J 1/10; H02J 1/102; H02J 3/32; H02J 3/381; H02J 1/12
See application file for complete search history.

(56) References Cited

U.S. PATENT DOCUMENTS

| | | |
|---|---|---|
| 8,438,998 B2 | 5/2013 | Spencer |
| 2012/0019073 A1* | 1/2012 | Huber ............ H02J 1/102 307/82 |

(Continued)

FOREIGN PATENT DOCUMENTS

| | | |
|---|---|---|
| JP | 2016-082666 A | 5/2016 |
| WO | 2012/057032 A1 | 5/2012 |

OTHER PUBLICATIONS

International Search Report issued in corresponding International Patent Application No. PCT/JP2019/003850, dated Apr. 23, 2019, with English translation.

*Primary Examiner* — Rexford N Barnie
*Assistant Examiner* — Rasem Mourad
(74) *Attorney, Agent, or Firm* — McDermott Will & Emery LLP

(57) ABSTRACT

A DC power supply system includes: a DC bus serving as a bus bar for DC power supply; a natural energy power generator 30 that supplies generated power to the DC bus; a plurality of storage batteries that store the generated power from the natural energy power generator; a plurality of bidirectional DC-DC converters that connect the plurality of corresponding storage batteries to the DC bus; a power management apparatus that manages operations of the plurality of bidirectional DC-DC converters; and a target voltage corrector that calculates a correction value of a target value for the output voltage by using an average value of a plurality of actual measurement values of each output voltage of the bidirectional DC-DC converters. The power management apparatus individually controls the each output voltage of the bidirectional DC-DC converters by using each target value of the output voltages corrected based on the correction value.

7 Claims, 5 Drawing Sheets

(56) References Cited

U.S. PATENT DOCUMENTS

| | | | |
|---|---|---|---|
| 2014/0247014 A1* | 9/2014 | Nishikawa | H01M 10/425 320/126 |
| 2015/0353001 A1* | 12/2015 | Fukui | H02M 3/33507 363/21.01 |
| 2016/0329716 A1 | 11/2016 | Inoue | |
| 2017/0207652 A1 | 7/2017 | Morita | |
| 2018/0167028 A1* | 6/2018 | Agarwal | H01M 10/48 |

* cited by examiner

DC POWER SUPPLY SYSTEM

CROSS REFERENCE

This application is the U.S. National Phase under 35 U.S.C. § 371 of International Application No. PCT/JP2019/003850, filed on Feb. 4, 2019, the entire contents of each are hereby incorporated by reference.

TECHNICAL FIELD

The present invention relates to a DC power supply system and, more particularly, to a DC power supply system constituted by combining a natural energy power generator such as a solar power generator and a plurality of storage batteries.

BACKGROUND ART

In recent years, a DC power supply system that supplies a DC power from a natural energy power generator, such as a solar power generator or a wind turbine generator, to a load device has attracted attention.

The power generation amount of a natural energy power generator depends upon weather and is thus unstable, so that a storage battery is used for stabilizing power supply. When the amount of power generation is large, the surplus power is charged to a storage battery, while when the power generation amount is small, the storage battery is discharged, whereby power can be stably supplied to a load.

Regarding the DC power supply system, for example, Patent Document 1 describes a configuration in which a plurality of storage batteries is connected to a DC bus through respective bidirectional DC-DC converters. In this configuration, the DC-DC converters are controlled such that when at least one of the plurality of storage batteries discharges power to the DC bus, at least another one of them is charged with power supplied from the DC bus. Further, the DC-DC converters are controlled such that a storage battery having a large storage amount is discharged, while a storage battery having a small storage amount is charged.

Further, Patent Document 2 describes a power route information generating device including a voltage change information acquisition part for acquiring information on a voltage change in each node connected to a DC bus line and a route information generation part for generating topology information in each node based on the voltage change information in each node acquired by the voltage change information acquisition part.

CITATION LIST

Patent Document

[Patent Document 1] Pamphlet of International Publication No. 2012/057032
[Patent Document 2] JP 2016-082666A

DISCLOSURE OF THE INVENTION

Problem to be Solved by the Invention

When a plurality of storage batteries are charged/discharged as described above, charge/discharge current in the DC-DC converter connected to each storage battery needs to be controlled so as to stabilize an output voltage.

However, it is difficult to make equal the charge/discharge current among a plurality of the bidirectional DC-DC converters, so that the storage batteries may have different charge/discharge amounts, resulting in unbalance in performance among them, such as those having a large charge amount and a small discharge amount and those having a small charge amount and a large discharge amount. Consequently there occurs individual difference in battery remaining capacity, and this may affect even battery lifetime.

The conventional DC power supply system described in Patent Document 1 does not take the number of charge/discharge cycles into consideration, and thus the charge/discharge amounts of the storage batteries may differ every cycle, making it likely to cause a variation in the battery remaining capacity. There is known a method for equalize the battery remaining capacities, in which, when the bidirectional DC-DC converters have different power amount, a droop operation is performed so as to make equal the power amounts. However, the actual output voltage of the bidirectional DC-DC converter is likely to deviate from a set voltage and, particularly when the power amount is small, it is difficult to make equal the battery remaining capacities.

It is therefore an object of the present invention to provide a DC power supply system capable of equalizing the remaining capacities of a plurality of storage batteries as much as possible.

Means for Solving the Problem

To solve the above problems, a DC power supply system according to the present invention includes: a DC bus serving as a bus bar for DC power supply; a natural energy power generator that supplies generated power to the DC bus; a plurality of storage batteries that store the generated power from the natural energy power generator; a plurality of bidirectional DC-DC converters that connect the plurality of corresponding storage batteries to the DC bus; a power management apparatus that manages operations of the plurality of bidirectional DC-DC converters; and a target voltage corrector that calculates a correction value of a target value for each output voltage of each of the bidirectional DC-DC converters by using an average value of a plurality of actual measurement values of the output voltages. The power management apparatus individually controls each output voltage of the bidirectional DC-DC converters by using each target value of the output voltages corrected based on the correction values.

According to the present invention, it is possible to control the output voltage of each of the bidirectional DC-DC converters such that the remaining capacities of the plurality of storage batteries are equal as much as possible.

In the present invention, the target voltage corrector preferably extracts, from at least one charge/discharge cycle of the plurality of storage batteries, a period during which a fluctuation width of an output current of the bidirectional DC-DC converter falls within a certain range and which each of the storage batteries continuously perform only a discharging operation for a certain period of time, as a correction value calculation period, calculates the average value of the plurality of the actual measurement values of the output voltage value in the correction value calculation period, and calculates the difference between the average value of the output voltage and the target value as a correction value of the target value for the output voltage. Thus, it is possible to accurately determine an error between the target voltage of the bidirectional DC-DC converter and the actually measured output voltage.

In the present invention, the target voltage corrector preferably extracts, from a plurality of charge/discharge cycles of the plurality of storage batteries, a plurality of periods during each of which the fluctuation width of the output current of the bidirectional DC-DC converter falls within a certain range and which each of the storage batteries continuously perform only a discharging operation for a certain period of time, as a correction value calculation period. This allows the correction value of the target value to be calculated from the average value of more amount of actual measurement value data, making it possible to increase the reliability of the correction value.

The target value for the output voltage is preferably a reference voltage on the DC bus. By correcting the target value for the output voltage of the bidirectional DC-DC converter with respect to the reference voltage on the DC bus, it is possible to reduce the difference between the actually measured output voltage of the bidirectional DC-DC converter and the reference voltage as much as possible, thus making it possible to make the remaining capacities of the plurality of storage batteries as equal as possible.

The plurality of storage batteries preferably include first and second storage batteries, the plurality of bidirectional DC-DC converters preferably include first and second bidirectional DC-DC converters connected respectively to the first and second storage batteries, and the target voltage corrector preferably calculates a correction value of a target value for an output voltage of the first bidirectional DC-DC converter from an average value of a plurality of actual measurement values of the output voltage of the first bidirectional DC-DC converter and calculates a correction value of a target value for an output voltage of the second bidirectional DC-DC converter from an average value of a plurality of actual measurement values of the output voltage of the second bidirectional DC-DC converter. Thus, it is possible to individually control the output voltage of the first and second bidirectional DC-DC converters such that the remaining capacities of the first and second storage batteries are equal as much as possible.

The target voltage corrector is preferably provided in the power management apparatus. This allows both the calculation of the correction value of the target voltage and the setting of the target value in the bidirectional DC-DC converter to be completed in the power management device.

It is preferable that the DC power supply system includes a cloud server configured to communicate with the power management apparatus, the target voltage corrector is provided in the cloud server, the power management apparatus transmits actual measurement data of an output current of each bidirectional DC-DC converter to the cloud server, and the target voltage corrector in the cloud server calculates the correction value of the target value for the output voltage of each bidirectional DC-DC converter by using the actual measurement data of the output current and transmits a result of the calculation back to the power management apparatus. Thus, the cloud server calculates the correction value based on long-term measured data, making it possible to obtain a highly reliable correction value. Further, on the cloud server, the correction value can be calculated utilizing AI (artificial intelligence), allowing the implementation of a function using machine learning.

Advantageous Effects of the Invention

As described above, according to the present invention, there can be provided a DC power supply system capable of equalizing the remaining capacities of a plurality of storage batteries as much as possible.

BRIEF DESCRIPTION OF THE DRAWINGS

FIGS. 2A and 2B are views for explaining the operation of the DC power supply system 1, wherein FIG. 2A illustrates an operation for charging the storage battery, and FIG. 2B illustrates an operation for discharging the storage battery.

MODE FOR CARRYING OUT THE INVENTION

Hereinafter, preferred embodiments of the present invention will be described in detail with reference to the accompanying drawings.

Figure 1:
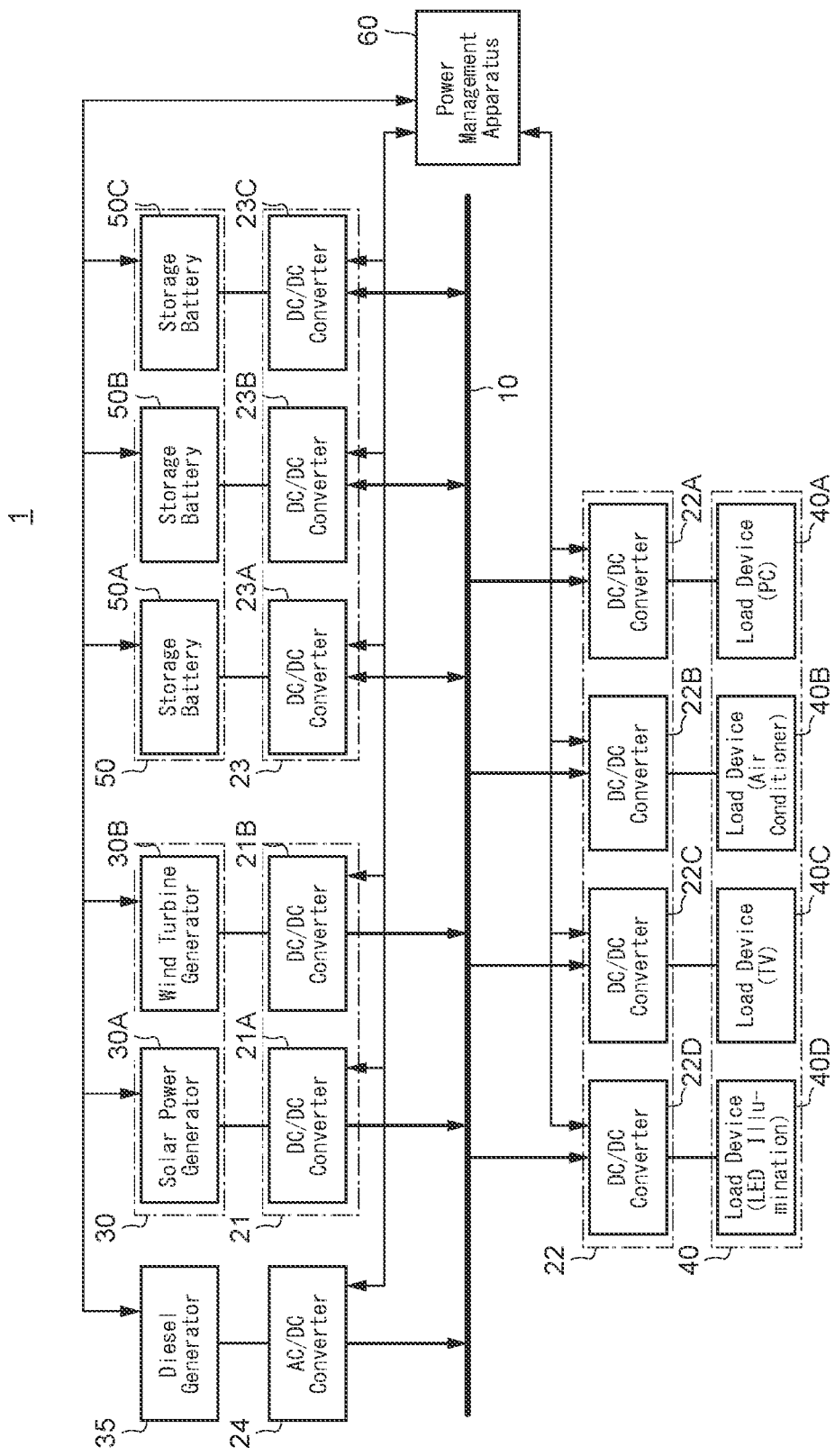
FIG. 1 is a block diagram schematically illustrating the configuration of a DC power supply system according to a first embodiment of the present invention.

FIG. 1 is a block diagram schematically illustrating the configuration of a DC power supply system according to a first embodiment of the present invention.

As illustrated in FIG. 1, a DC power supply system 1 according to the present embodiment includes a DC bus 10 serving as a bus bar for DC power supply, DC-DC converters 21 to 23 connected to the DC bus 10, a natural energy power generator 30 connected to the DC bus 10 through the DC-DC converter 21, a load device 40 connected to the DC bus 10 through the DC-DC converter 22, a storage battery 50 connected to the DC bus 10 through the DC-DC converter 23, and a power management apparatus 60 that manages the entire system including operations of the DC-DC converters 21 to 23 such that it compares the amount of power generated by the natural energy power generator 30 and the amount of load power consumed by the load device 40, charges the storage battery 50 when the power generation amount exceeds the load power amount, and discharges the storage battery 50 when the load power amount exceeds the power generation amount.

The DC bus 10 is a high-voltage DC transmission line of, e.g., 350±100 V. Thus, when a device operating at a voltage lower than 350±100 V is connected to the DC bus 10, it needs to be connected thereto through a DC-DC converter. The DC-DC converter 21 is a unidirectional DC-DC converter (step-up converter) that steps up a power of, e.g., 240 V from the natural energy power generator 30 to 350 V and supplies the resultant power to the DC bus 10. The DC-DC converter 22 is a unidirectional DC-DC converter (step-down converter) that steps down a power of 350 V on the DC bus 10 to 24 V and supplies the resultant power to the load device 40. The DC-DC converter 23 is a bidirectional DC-DC converter that steps down (or steps up) a power on the DC bus 10 and supplies the resultant power to the storage battery 50, as well as steps up (or steps down) a power from the storage battery 50 and supplies the resultant power to the DC bus 10. The DC-DC converters 21 to 23 have an ON/OFF command reception function and a power amount regulation command reception function and are configured to communicate with the power management apparatus 60.

The natural energy power generator 30 is, for example, a solar power generator 30A and a wind turbine generator 30B. In the present embodiment, the solar power generator 30A includes a solar panel and a power conditioner and is connected to the DC bus 10 through a DC-DC converter 21A. When the operating voltage of the solar power generator 30A is close to the voltage on the DC bus 10, the DC-DC converter 21A need not be used. Further, when the target voltage on the DC bus 10 is regulated by the power management apparatus 60 for MPPT (Maximum Power Point Tracking), the power conditioner can be omitted. The wind turbine generator 30B includes a generator main body and a power conditioner and is connected to the DC bus 10 through a DC-DC converter 21B. The DC-DC converters 21A and 21B may each be incorporated in its corresponding power conditioner. The power conditioner has a MPPT (Maximum Power Point Tracking) function, an ON/OFF command reception function, a power amount regulation command reception function, a power generation information transmission function, and the like and is configured to communicate with the power management apparatus 60. Although the type and the number of the natural energy power generators 30 to be connected to the DC bus 10 are not particularly limited, the solar power generator 30A is preferably provided as the natural energy power generator 30. The power generated by the solar power generator 30A and wind turbine generator 30B is supplied to the load device 40 and storage battery 50 through the DC bus 10.

The load device 40 may be, for example, a PC, an air conditioner, a TV, an LED illumination device, and the like. The load devices 40A to 40D are connected to the DC bus 10 through DC-DC converters 22A to 22D, respectively, and receive power supply from the DC bus 10.

The storage battery 50 includes a plurality of storage batteries 50A to 50C. The storage batteries 50A to 50C each include a storage battery main body (battery cell) and a BMU (Storage battery Management Unit) for monitoring and controlling the charge state. The storage batteries 50A to 50C are connected to the DC bus 10 through bidirectional DC-DC converters 23A to 23C, respectively. When the power generated by the natural energy power generator 30 is larger than the power (load power) consumed by the load device 40, the storage batteries 50A to 50C are charged with the surplus of the generated power; while when the load power is larger than the generated power, the storage batteries 50A to 50C are discharged to supplement the deficiency of the load power. The storage batteries 50A to 50C have substantially the same maximum capacity and charge/discharge performance. The BMU of the storage battery 50 has an ON/OFF command reception function, a DC bus voltage regulation command reception function, a charge/discharge current amount regulation command reception function, a storage battery information transmission function, and the like and is configured to communicate with the power management apparatus 60. The storage battery charging rate of each of the storage batteries 50A to 50C is indicated by a SOC (State Of Charge: remaining capacity (Ah)/full charge capacity (Ah)×100), which is notified to the power management apparatus 60 as needed.

The DC power supply system 1 may further include a diesel generator 35. When the power generated by the natural energy power generator 30 is low, or when the remaining capacity of the storage battery 50 is small, the diesel generator 35 is activated to forcibly increase the amount of power generation. This can avoid a regulation of load power and a blackout, allowing power to be stably supplied to the load device 40. Further, the diesel generator 35 can be used as a power source for start-up of the entire system including the DC bus 10. In general, the diesel generator 35 generates an AC output and is thus connected to the DC bus 10 through an AC-DC converter 24.

The power management apparatus 60 is a computer system equipped with an EMS (Energy Management System). The power management apparatus 60 can remotely control input/output operations of the DC-DC converters 21 to 23 and control the amount of power generated by the natural energy power generator 30 and the power demand of the load device 40. To maintain the voltage on the DC bus 10, the power management apparatus 60 issues commands to the natural energy power generator 30, load device 40, and storage battery 50 and collects information from these devices. The command issuance and information collection are performed using a communication scheme such as RS-232C, RS-485, a CAN (Controller Area Network), Ethernet, Wi-Fi, or the like.

The DC-DC converters 21 to 23 each control its output voltage so as to bring it close to a target value given by the power management apparatus 60. The target values for the output voltage (grid output voltage) of the DC-DC converters 21 to 23 to be supplied to the DC bus 10 can be individually specified by a command from the power management apparatus 60 and are set, in general, to the reference voltage (350 V) of the DC bus 10. The DC-DC converters 21 to 23 each have an ammeter and a voltmeter. Measurement values of the output current and output voltage taken by the DC-DC converters 21 to 23 are transmitted to the power management apparatus 60. The power management apparatus 60 can change the target output voltage value as needed based on the measurement values of the output current and output voltage.

Figure 2A:
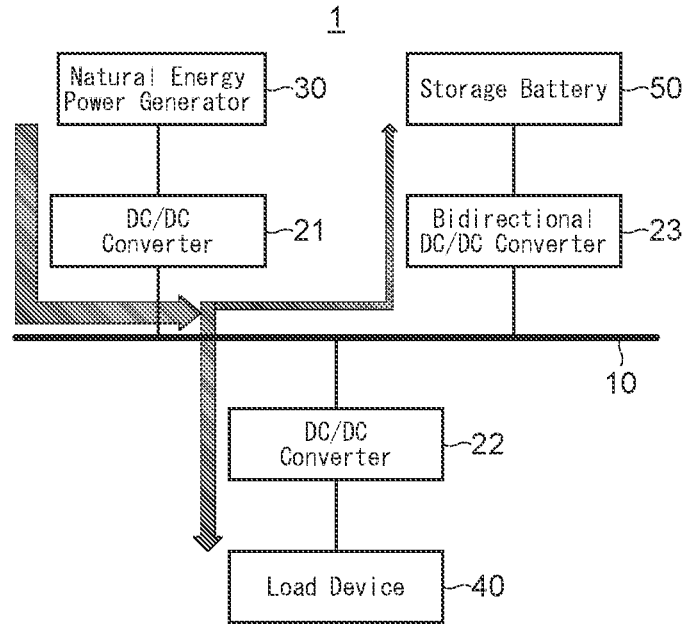
Figure 2B:
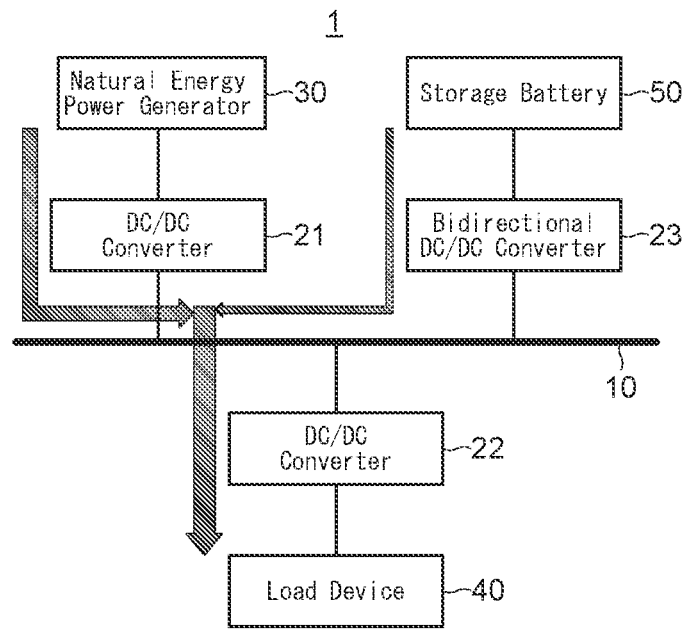

FIGS. 2A and 2B are views for explaining the operation of the DC power supply system 1. FIG. 2A illustrates an operation for charging the storage battery 50, and FIG. 2B illustrates an operation for discharging the storage battery 50.

As illustrated in FIG. 2A, when the amount of power generated by the natural energy power generator 30 is larger than the amount of load power consumed by the load device 40, the storage battery 50 is charged with the surplus of the generated power. The power generated by the natural energy power generator 30 is supplied to the storage battery 50 through the DC-DC converter 21, the DC bus 10, and the bidirectional DC-DC converter 23.

As illustrated in FIG. 2B, when the amount of load power consumed by the load device 40 is larger than the amount of power generated by the natural energy power generator 30, the storage battery 50 is discharged to supply a necessary power to the load device 40. The power from the storage battery 50 is supplied to the load device 40 through the bidirectional DC-DC converter 23, the DC bus 10, and the DC-DC converter 22.

The storage battery 50 is discharged when the voltage of the DC bus 10 is lower than the target output voltage value in the bidirectional DC-DC converter 23 and charged when the voltage of the DC bus 10 is higher than the target output voltage value in the bidirectional DC-DC converter 23. Therefore, the control of the output voltage of the bidirectional DC-DC converter 23 is a key factor. In general, the target output voltage value in the bidirectional DC-DC converter 23 is controlled by the power management apparatus 60 and is set to the reference voltage value (350 V) of the DC bus 10.

However, as illustrated in FIG. 1, when the plurality of storage batteries 50A to 50C are connected to the DC bus 10 through the bidirectional DC-DC converters 23A to 23C, respectively, and a variation occurs in the actual output voltage among the bidirectional DC-DC converters 23A to 23C, a variation occurs also in the remaining capacity among the storage batteries 50A to 50C, and the variation becomes larger as the operating time of the DC power supply system 1 is made longer. Thus, in the DC power supply system 1 according to the present embodiment, the target output voltage values are individually controlled based on the actual measurement values for the output voltage of the bidirectional DC-DC converters 23A to 23C to reduce the variation in the output voltage among the bidirectional DC-DC converters 23A to 23C to thereby reduce the variation in the remaining capacity among the storage batteries 50A to 50C.

Figure 3:
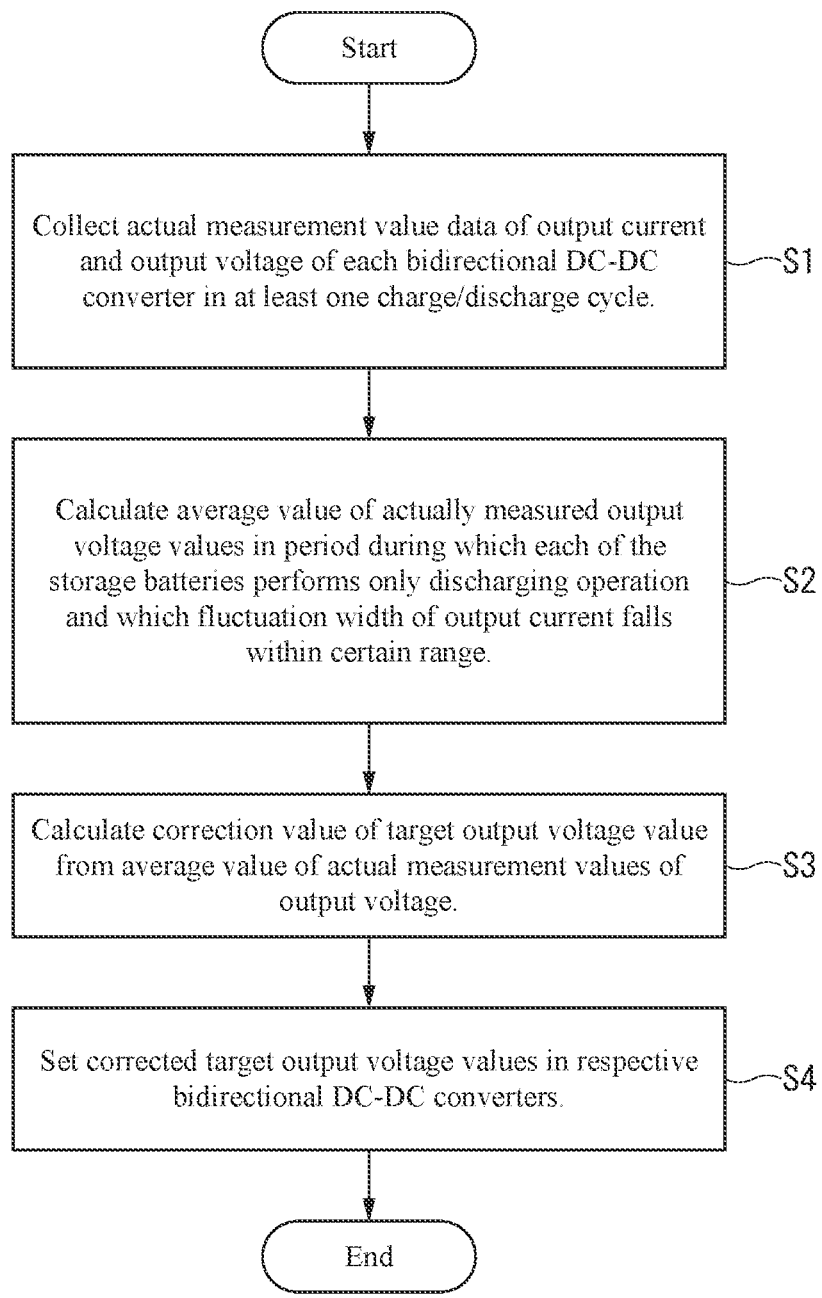
FIG. 3 is a flowchart illustrating a method of setting the output voltage of the plurality of bidirectional DC-DC converters by the power management apparatus.

FIG. 3 is a flowchart illustrating a method of setting the output voltage of the plurality of bidirectional DC-DC converters by the power management apparatus 60.

As illustrated in FIG. 3, the power management apparatus 60 collects actual measurement value data of the output current and output voltage of each bidirectional DC-DC converter in at least one charge/discharge cycle of the storage batteries 50A to 50C (step S1). The power management apparatus 60 monitors the output current and output voltage measured by the ammeter and voltmeter provided in each of the bidirectional DC-DC converters 23A to 23C. The actual measurement data of the output current and output voltage is stored in a storage device, such as a memory or an HDD, provided in the power management apparatus 60.

Then, the power management apparatus 60 extracts, as a correction value calculation period, a period during which each of the storage batteries 50A to 50C continuously perform only a discharging operation and which the fluctuation width of the output current falls within a certain range and calculates the average value of the actually measured output voltage values in the correction value calculation period (step S2). In general, the storage batteries 50A to 50C continuously perform discharge operation in the night, so that the actual measurement values of the output voltage of the bidirectional DC-DC converters 23A to 23C acquired in the night are preferably used for the average calculation. By calculating the actual measurement values in a period during which the output voltage is stable, it is possible to accurately determine an error between the actual measurement value and the target value.

Then, the power management apparatus 60 calculates a correction value of the target output voltage value in each of the bidirectional DC-DC converters 23A to 23C from the average value of a plurality of actual measurement values of the output voltage of each of the bidirectional DC-DC converters 23A to 23C (step S3). Specifically, the difference between the average value of the actual measurement output voltage values and the target output voltage value is calculated as the correction value of the target output voltage value. Thereafter, the calculated correction value is added to the target value to determine the corrected target output voltage value.

For example, when the average value of the actual measurement values is 349 V for the target output voltage value of 350 V, the correction value of the target value is 1 V (=350-349). Accordingly, the corrected target output voltage value is 351 V (350+1). When the average value of the actual measurement values is 351 V for the target output voltage value of 350 V, the correction value of the target value is −1 V (=350-351). Accordingly, the corrected target output voltage value is 349 V (=350+(−1)).

Thereafter, the power management apparatus 60 sets the corrected target output voltage values in the bidirectional DC-DC converters 23A to 23C, respectively (step S4). This allows the actual measurement output voltage value in each of the bidirectional DC-DC converters 23A to 23C to be brought close to the target value.

The correction and setting of the target output voltage values in the bidirectional DC-DC converters 23A to 23C may be performed every time one charge/discharge cycle of the storage batteries 50A to 50C ends or may be performed collectively after a plurality of charge/discharge cycles end. In the former case, a change in the target output voltage values in the bidirectional DC-DC converters 23A to 23C is performed once a day. In the latter case, a change in the target output voltage values in the bidirectional DC-DC converters 23A to 23C is performed once every several days, and the correction value calculation is performed in a plurality of discontinuous periods.

Figure 4A:
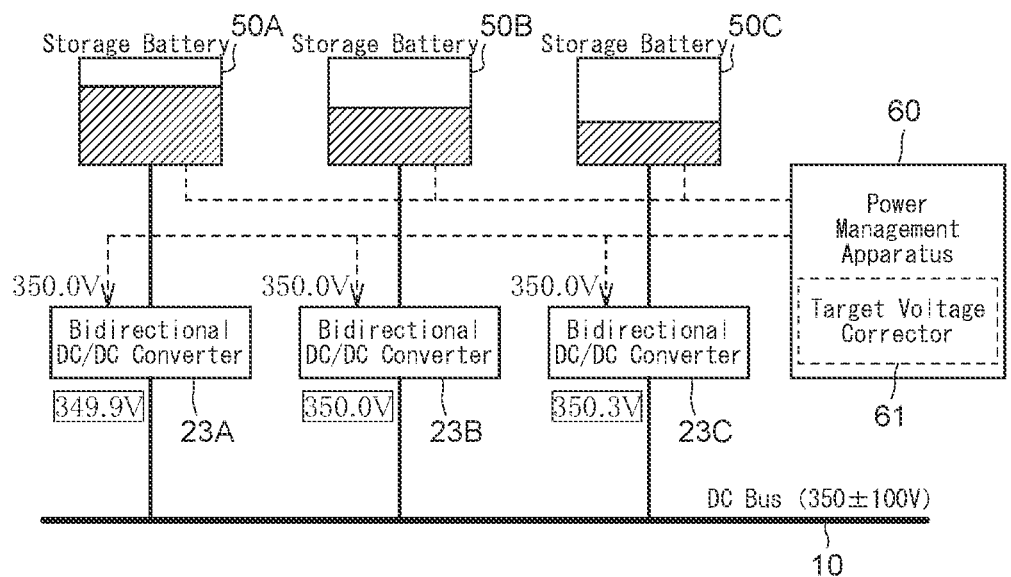
FIGS. 4A and 4B are schematic views for explaining more specifically the operation of correcting the target output voltage values in the bidirectional DC-DC converters.
Figure 4B:
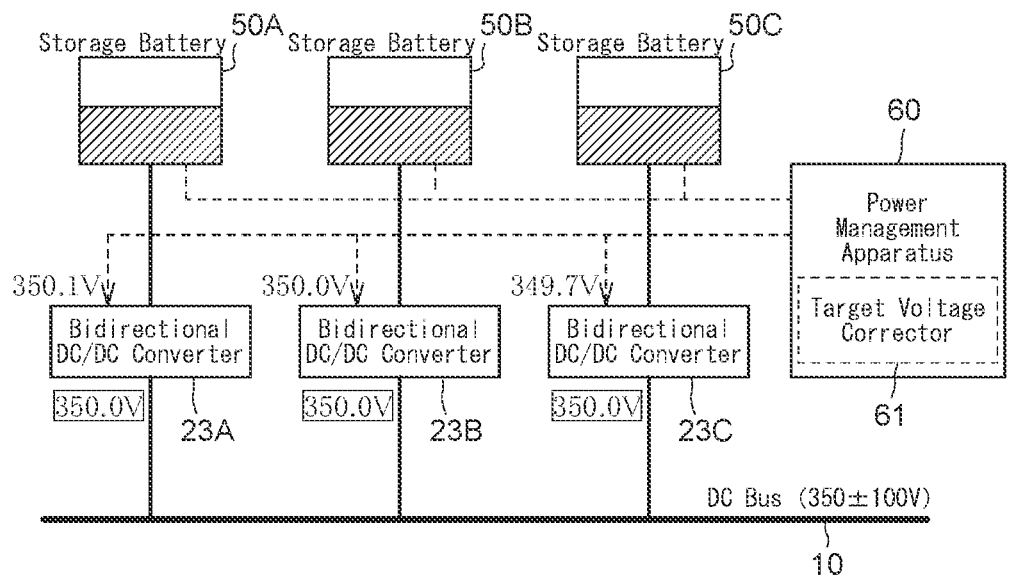

FIGS. 4A and 4B are schematic views for explaining more specifically the operation of correcting the target output voltage values in the bidirectional DC-DC converters 23A to 23C.

As illustrated in FIG. 4A, when the target output voltage values in the bidirectional DC-DC converters 23A to 23C are set to the same value (in this example, 350.0 V), a variation occurs in the output voltage among the bidirectional DC-DC converters 23A to 23C due to individual differences of the bidirectional DC-DC converters 23A to 23C and a variation in the distribution of resistivity among power lines to which the bidirectional DC-DC converters 23A to 23C are connected. For example, as illustrated, the average value of the actually measured output voltage values in the bidirectional DC-DC converter 23A is 349.9 V, the average value of the actually measured output voltage values in the bidirectional DC-DC converter 23B is 350.0 V, and the average value of the actually measured output voltage values in the bidirectional DC-DC converter 23C is 350.3 V.

To reduce such a variation in the output voltage, the target output voltage values in the bidirectional DC-DC converters 23A to 23C are changed to 350.1 V, 350.0 V, and 349.7V, respectively. These corrected target output voltage values are results obtained by a target voltage corrector 61 of the power management apparatus 60 performing calculation along the procedure illustrated in FIG. 3. By changing the target values in the bidirectional DC-DC converters 23A to 23C according to a command from the power management apparatus 60, the bidirectional DC-DC converters 23A to 23C can have the same actual output voltage of 350.0 V. Thus, it is possible to reduce a variation in the output voltage among the storage batteries 50A to 50C as much as possible.

As described above, in the DC power supply system 1 according to the present embodiment, the power management apparatus 60 corrects the target values based on the actual measurement values of the output voltage of the bidirectional DC-DC converters 23A to 23C, so that it is possible to reduce a variation in the output voltage among the bidirectional DC-DC converters 23A to 23C, thus making it possible to reduce a variation in the remaining capacity among the storage batteries 50A to 50C as much as possible.

Figure 5:
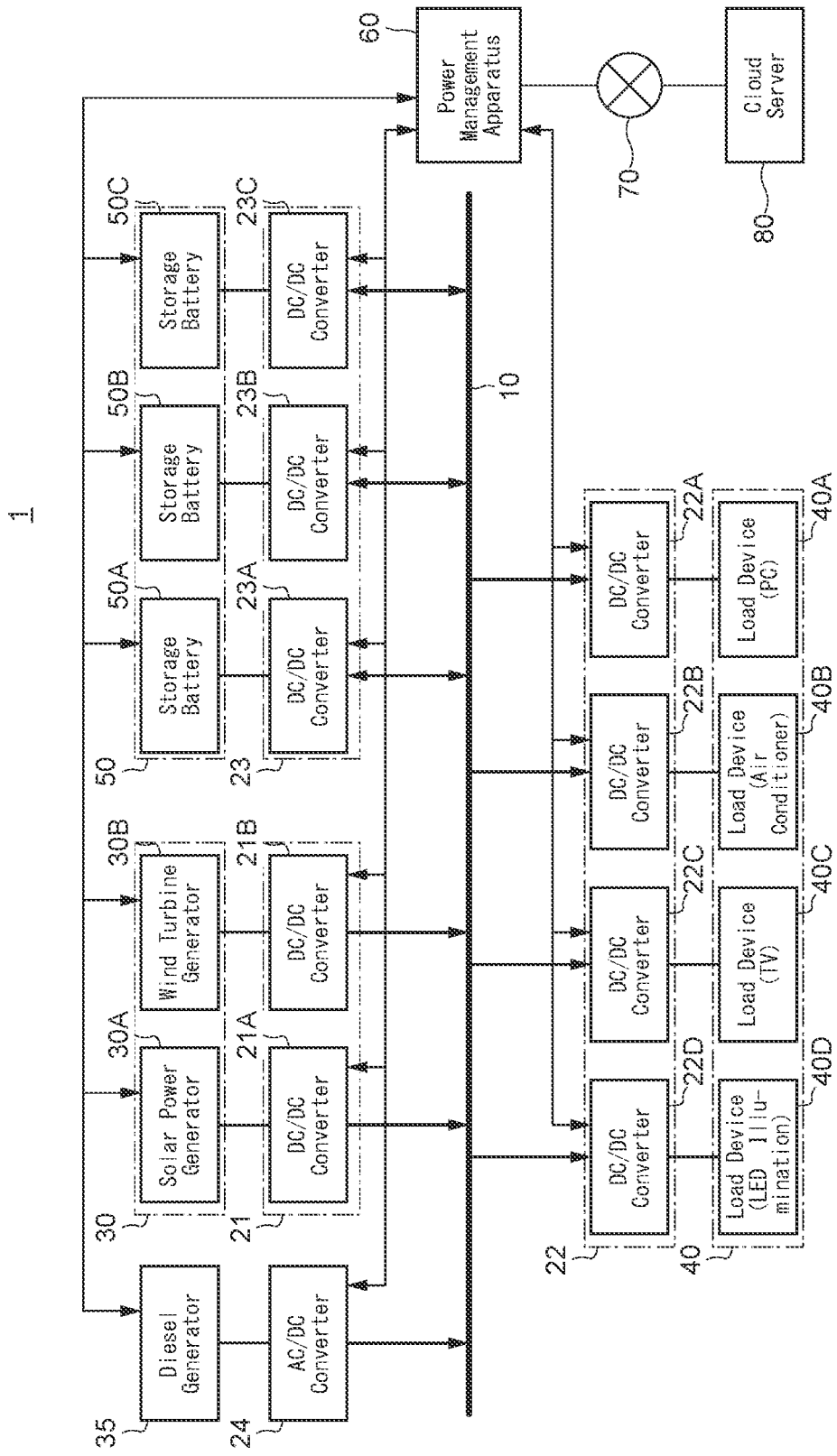
FIG. 5 is a block diagram schematically illustrating the configuration of a DC power supply system according to a second embodiment of the present invention.

FIG. 5 is a block diagram schematically illustrating the configuration of a DC power supply system according to a second embodiment of the present invention.

As illustrated in FIG. 5, the DC power supply system 1 according to the present embodiment is featured in that it has a cloud server 80 configured to perform data communication with the power management apparatus 60 over a communication network 70 such as Internet and to calculate correction values of the target output voltage values in the bidirectional DC-DC converters 23A to 23C. That is, the function (target voltage corrector 61) of calculating the correction value of the target output voltage value provided in the power management apparatus 60 in the first embodiment is provided outside the power management apparatus 60. Other configurations are the same as those of the first embodiment.

In the present embodiment, the power management apparatus 60 receives, from the bidirectional DC-DC converters 23A to 23C, actual measurement value data of the output current and output voltage of the bidirectional DC-DC converters 23A to 23C and transmits the received data to the cloud server 80 as needed. The cloud server 80 stores and accumulates the actual measurement value data of the output current and output voltage transmitted from the power management apparatus 60 in its storage device. Then, at the point of time when all the necessary data are collected, the cloud server 80 calculates the correction values of the target output voltage values in the bidirectional DC-DC converters 23A to 23C and transmits a result of the calculation back to the power management apparatus 60.

The power management apparatus 60 receives from the cloud server 80 the correction values of the target output voltage values in the bidirectional DC-DC converters 23A to 23C and sets the received correction values in the bidirectional DC-DC converters 23A to 23C, respectively. This allows the actual measurement output voltage value in each of the bidirectional DC-DC converters 23A to 23C to be brought close to the target value.

The cloud server 80 may perform the correction of the target output voltage values every time one charge/discharge cycle of the storage batteries 50A to 50C ends or may perform collectively after a plurality of charge/discharge cycles end. In the former case, a change in the target output voltage values in the bidirectional DC-DC converters 23A to 23C can be performed once a day. In the latter case, a change in the target output voltage values in the bidirectional DC-DC converters 23A to 23C can be performed once every several days.

As described above, in the DC power supply system 1 according to the present embodiment, the cloud server 80 corrects the target values based on the actual measurement values of the output voltage of the bidirectional DC-DC converters 23A to 23C, so that it is possible to accurately set the output voltages of the bidirectional DC-DC converters 23A to 23C uniformly to the target voltage, thus making it possible to reduce a variation in the remaining capacity among the storage batteries 50A to 50C as much as possible. Further, not the power management apparatus 60, but the cloud server 80 calculates the correction value of the target output voltage value, so that it is not necessary for the power management apparatus 60 to have a special calculation function, thus allowing the present invention to be achieved by the existing power management apparatus 60. Further, the cloud server 80 calculates the correction value based on long-term measured data, making it possible to obtain a highly reliable correction value. Further, on the cloud server, the correction value can be calculated utilizing AI (artificial intelligence), allowing the implementation of a function using machine learning.

While the preferred embodiments of the present invention have been described, the present invention is not limited to the above embodiments, and various modifications may be made within the scope of the present invention, and all such modifications are included in the present invention.

For example, although the three storage batteries 50A to 50C are used to constitute a storage battery system in the above embodiments, the number of the storage batteries is not limited as long as it is two or more. Further, a change in the target value of the output voltage of each bidirectional DC-DC converter need not necessarily be performed every time a new correction value is obtained and may be omitted when a correction width is significantly smaller than the set target value.

Further, although the target voltage corrector is provided in only the cloud server 80 but not provided in the power management apparatus 60 in the second embodiment, it may be provided both in the power management apparatus 60 and cloud server 80. In this case, for example, the power management apparatus 60 and the cloud server 80 calculate the correction value based on short-term measurement data and long-term measurement data, respectively, and the correction values obtained by the power management apparatus 60 and cloud server 80 are selectively used for the respective bidirectional DC-DC converters to set their target values.

EXAMPLES

A DC power supply system having a storage battery system in which six storage batteries are connected to a DC bus through corresponding bidirectional DC-DC converters was prepared, and the output current and output voltage of each of the bidirectional DC-DC converters were measured in the night during which the discharge operation of the storage batteries is continuously performed. Then, the average value of the output voltage in a period during which the output current falls within a certain range (0 to −3 A) was calculated. As a result, as shown in Table 1, the average value of the output voltage of a bidirectional DC-DC converter #1 was 349.71 V, the average value of the output voltage of a bidirectional DC-DC converter #2 was 349.98 V, the average value of the output voltage of a bidirectional DC-DC converter #3 was 350.04 V, the average value of the output voltage of a bidirectional DC-DC converter #4 was 349.86 V, the average value of the output voltage of a bidirectional DC-DC converter #5 was 350.09 V, and the average value of the output voltage of a bidirectional DC-DC converter #6 was 350.32 V.

Based on the above results, the difference between the actual value and the target value (350 V) for the output voltage of each of the bidirectional DC-DC converters #1 to #6 was calculated as a corrected target value. As a result, the corrected target value of the output voltage in the bidirectional DC-DC converters #1 was 0.3 V (≈0.29 V), the corrected target value of the output voltage in the bidirectional DC-DC converters #2 was 0 V (≈0.02 V), the corrected target value of the output voltage in the bidirectional DC-DC converters #3 was −0.1 V (≈−0.04 V), the corrected target value of the output voltage in the bidirectional DC-DC converters #4 was 0.1 V (≈0.14 V), the corrected target value of the output voltage in the bidirectional DC-DC converters #5 was −0.1 V (≈−0.09 V), and the corrected target value of the output voltage in the bidirectional DC-DC converters #6 was −0.3 V (≈−0.32 V).

The following day, the power management apparatus 60 set the corrected target output values in the bidirectional DC-DC converters #1 to #6, and the DC power supply system was operated. Specifically, the target output voltage value in the bidirectional DC-DC converter #1 was set to 350.3 V, the target output voltage value in the bidirectional DC-DC converter #2 was set to 350.0 V, the target output voltage value in the bidirectional DC-DC converter #3 was set to 349.9 V, the target output voltage value in the bidirectional DC-DC converter #4 was set to 350.1 V, the target output voltage value in the bidirectional DC-DC converter #5 was set to 349.9 V, and the target output voltage value in the bidirectional DC-DC converter #6 was set to 349.7 V. Then, the output current and output voltage of each of the bidirectional DC-DC converters #1 to #6 were measured for 12 hours in the night, and the average value of the output voltage in a period during which the output current falls within a certain range (0 to −3 A) was calculated. As a result, the average values of the output voltage in the bidirectional DC-DC converters #1 to #6 could be uniformly set to 350.0 V which is the reference voltage of the DC bus.

TABLE 1

| Bidirectional DC-DC converter | Set voltage | Average of the measured voltage | Average of the difference | Target output voltage |
|---|---|---|---|---|
| #1 | 350.0 | 349.78 | 0.29 | 349.71 |
| #2 | 350.0 | 350.05 | 0.02 | 349.98 |
| #3 | 350.0 | 350.11 | −0.04 | 350.04 |
| #4 | 350.0 | 349.94 | 0.14 | 349.86 |
| #5 | 350.0 | 350.17 | −0.09 | 350.09 |
| #6 | 350.0 | 350.40 | −0.32 | 350.32 |

REFERENCE SIGNS LIST

1 DC power supply system
10 DC bus
21, 21A, 21B converter
22, 22A-22D converter
23, 23A-23C bidirectional DC-DC converter
24 AC-DC converter
30 natural energy power generator
30A solar power generator
30B wind turbine generator
35 diesel generator
40, 40A-40D load device
50, 50A-50C storage battery
60 power management apparatus
61 target voltage corrector
70 communication network
80 cloud server

The invention claimed is:

1. A DC power supply system comprising:
a DC bus serving as a bus bar for DC power supply;
a natural energy power generator that supplies generated power to the DC bus; a plurality of storage batteries that store the generated power from the natural energy power generator;
a plurality of bidirectional DC-DC converters that connect the plurality of corresponding storage batteries to the DC bus, the plurality of bidirectional DC-DC converters including a first bidirectional DC-DC converter and a second bidirectional DC-DC converter;
a power management apparatus that manages operations of the plurality of bidirectional DC-DC converters; and
a target voltage correction circuit that i) calculates a first correction value of a target value for a first output voltage of the first bi-directional DC-DC converter from a first average value of a plurality of first actual measurement values taken at different times of the first output voltage of the first bidirectional DC-DC converter and ii) calculates a second correction value of the target value for a second output voltage of the second bidirectional DC-DC converter from a second average value of a plurality of second actual measurement values taken at different times of the second output voltage of the second bidirectional DC-DC converter,
wherein the power management apparatus individually controls each output voltage of the bidirectional DC-DC converters by using each target value of the output voltages corrected based on the correction values such that the power management apparatus controls i) the first output voltage of the first bidirectional DC-DC converter using the first output voltage corrected based on the calculated first correction value and ii) the second output voltage of the second bidirectional DC-DC converter using the second output voltage corrected based on the calculated second correction value.

2. The DC power supply system according to claim 1, wherein the target voltage correction circuit extracts, from at least one charge/discharge cycle of the plurality of storage batteries, a period during which a fluctuation width of an output current of the bidirectional DC-DC converter falls within a certain range and which each of the storage batteries continuously perform only a discharging operation for a certain period of time, as a correction value calculation period,
wherein the target voltage correction circuit calculates the first average value of the plurality of the first actual measurement values of the first output voltage value and the second average value of the plurality of the second actual measurement values of the second output voltage value in the correction value calculation period, and
wherein the target voltage correction circuit calculates i) a first difference between the first average value of the first output voltage and the target value as the first correction value of the target value for the first output voltage and ii) a second difference between the second average value of the second output voltage and the target value as the second correction value of the target value for the second output voltage.

3. The DC power supply system according to claim 2, wherein the target voltage correction circuit extracts, from a plurality of charge/discharge cycles of the plurality of storage batteries, a plurality of periods during each of which the fluctuation width of the output current of the bidirectional DC-DC converter falls within a certain range and which each of the storage batteries continuously perform only a discharging operation for a certain period of time, as the correction value calculation period.

4. The DC power supply system according to claim 1, wherein the target value is a reference voltage on the DC bus.

5. The DC power supply system according to claim 1, wherein the plurality of storage batteries include first and second storage batteries,
wherein the first and second bidirectional DC-DC converters are connected respectively to the first and second storage batteries.

6. The DC power supply system according to claim 1, wherein the target voltage correction circuit is provided in the power management apparatus.

7. The DC power supply system according to claim 1, further comprising a cloud server configured to communicate with the power management apparatus,
wherein the target voltage correction circuit is provided in the cloud server, wherein the power management apparatus transmits actual measurement data of an output current of each bidirectional DC-DC converter to the cloud server, and wherein the target voltage correction circuit in the cloud server calculates the first correction value of the target value for the first output voltage of the first bidirectional DC-DC converter and the second correction value of the target value for the second output voltage of the second bidirectional DC-DC converter and transmits a result of the calculation back to the power management apparatus.

* * * * *